United States Patent [19]

Shoji et al.

[11] Patent Number: 4,583,133
[45] Date of Patent: Apr. 15, 1986

[54] DATA TRANSFER SYSTEM WITH A PLURALITY OF DISKLIKE RECORD MEDIA FOR SELECTIVE USE

[75] Inventors: Makoto Shoji, Fussa; Yoshiaki Sakai, Tokyo, both of Japan

[73] Assignee: Teac Corporation, Tokyo, Japan

[21] Appl. No.: 584,725

[22] Filed: Feb. 29, 1984

[30] Foreign Application Priority Data

Mar. 24, 1983 [JP] Japan ................................. 58-49979

[51] Int. Cl.[4] ....................... G11B 15/18; G11B 15/16
[52] U.S. Cl. ........................................ 360/69; 360/98; 360/99
[58] Field of Search ....................... 360/69, 63, 61, 71, 360/98, 99, 133, 74.1; 369/180, 233

[56] References Cited

U.S. PATENT DOCUMENTS

| 3,678,481 | 7/1972 | Dalziel et al. ........................ 340/174 |
| 4,086,636 | 4/1978 | Cizmio et al. . |
| 4,089,029 | 5/1978 | Castrodale et al. .................... 360/99 |
| 4,414,590 | 11/1983 | Merdian, Jr. .......................... 360/98 |

Primary Examiner—Vincent P. Canney
Attorney, Agent, or Firm—Woodcock, Washburn, Kurtz, Mackiewicz & Norris

[57] ABSTRACT

Several data storage devices for use with flexible magnetic disks are daisy chained to a central processing unit via a controller to be selectively driven thereby for data transfer with the magnetic disks. Each storage device has a motor control circuit for setting the magnetic disk into rotation when a corresponding DRIVE SELECT signal from the controller assumes a prescribed state for the first time after and IN USE signal common to all the storage devices has assumed a prescribed state. Further the motor control circuits sets the magnetic disk out of rotation when the DRIVE SELECT signal assumes the prescribed state for the first time after the IN USE signal has been set out of the prescribed state. Thus the storage devices are held out of operation to avoid unnecessary power consumption even after the production of the IN USE signal, until the associated DRIVE SELECT signals are applied. Moreover, once set into operation, the storage devices remain so despite changes in the states of the DRIVE SELECT signals during the production of the IN USE signal, allowing ready access for data transfer.

9 Claims, 7 Drawing Figures

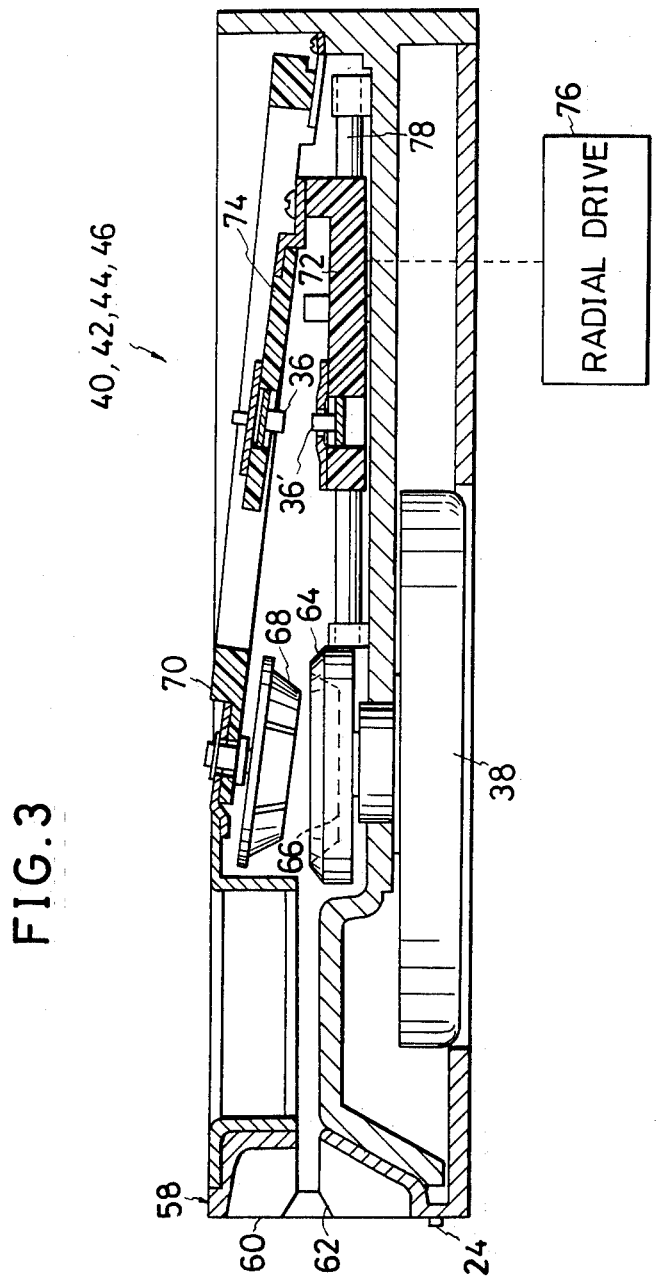

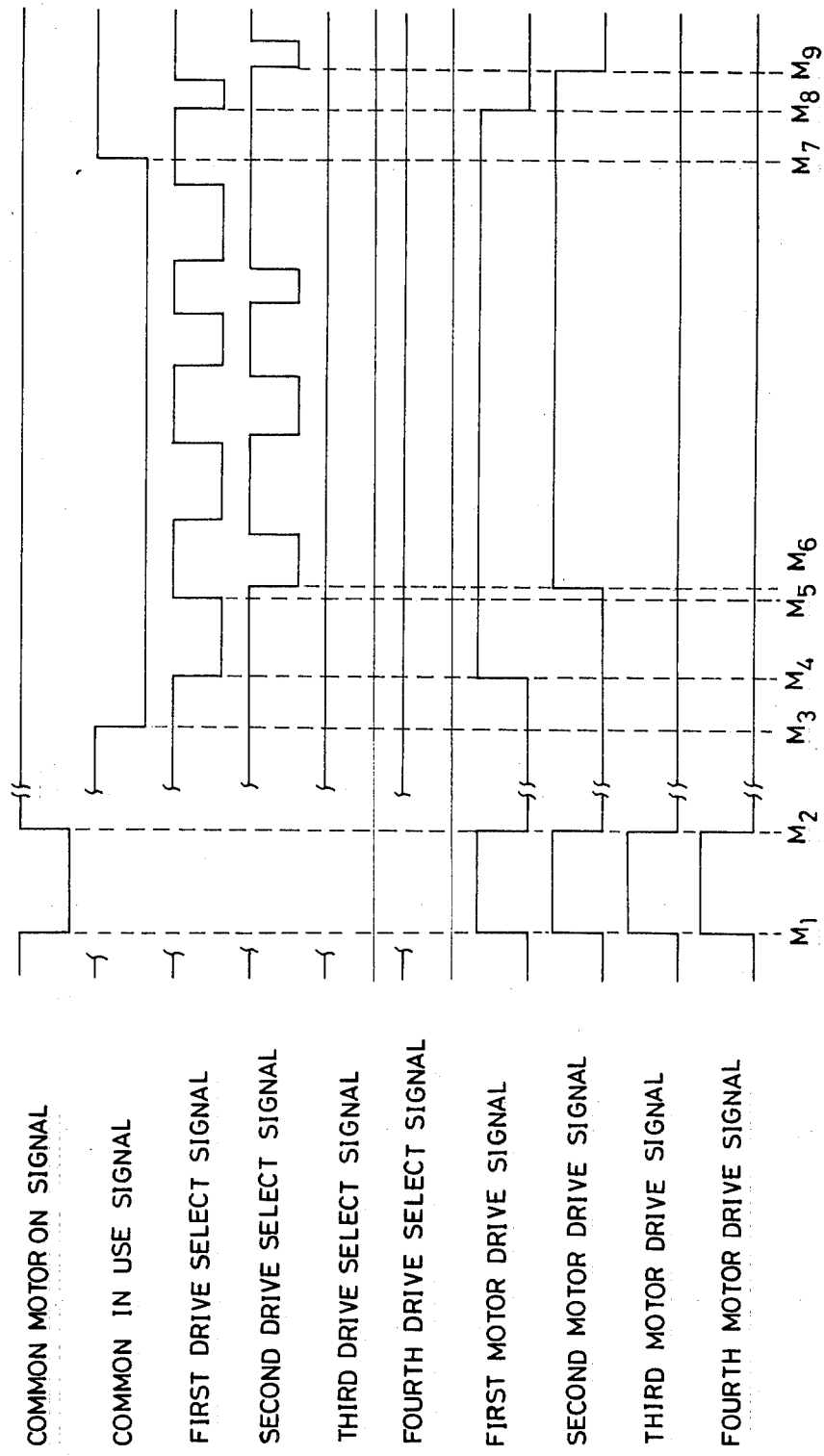

DATA TRANSFER SYSTEM WITH A PLURALITY OF DISKLIKE RECORD MEDIA FOR SELECTIVE USE

BACKGROUND OF THE INVENTION

Our invention relates to apparatus employing disklike record media for the recording and/or reproduction of information, and more specifically to a data transfer system of the type comprising a plurality of daisy chained disk drives or files for selective data transfer to or from several record disks. Our invention has particular utility in conjunction with flexible magnetic disks known also as floppy disks, although we do not wish our invention to be unnecessarily limited thereto.

Flexible magnetic disks have found widespread acceptance in information processing and allied industries as compact data storage media. Being thin and limply flexible, the disks are commonly enclosed in more rigid, apertured envelopes to make up disk assemblies or cartridges that are self supporting. A variety of disk files or drives have been suggested and used for data transfer to and from such disk cartridges. Dalziel et al. U.S. Pat. No. 3,678,481 and Castrodale et al. U.S. Pat. No. 4,089,029 disclose examples of such known devices.

It has also been known to "daisy chain" a plurality of such disk files to a central processing unit (CPU) via a controller, with the disk files in parallel relation to each other, for selective use of the magnetic disks in the files. In a typical conventional data storage system comprising a group of daisy chained disk files (see FIG. 1 of the drawings attached hereto), the controller applies a common MOTOR ON signal to the motor drive circuits of all the files. The MOTOR ON signal sets all the disk drive motors into rotation, regardless of whether each file is being used for data tranfer or not. This of course incurs a substantial waste of electrical energy and shortens the useful life of the disk drives. It might be contemplated to rotate each disk drive motor only when the associated disk is actually required for data storage or readout. This solution would necessitate a sacrifice in accessibility, however, as the motors on energization require a considerable length of time to pick up speed and start rotation at a required constant rate.

SUMMARY OF THE INVENTION

Our invention provides a truly satisfactory solution to the above problem and makes possible the substantial curtailment of the power requirement by data transfer systems of the type having a plurality of disk files for selective recording or reproduction of information.

Stated in brief, our invention provides a data transfer system for use with a plurality of disklike record media. Included are a plurality of disk drive means each including a disk drive motor for rotating one record medium in data transfer relation with a transducer. Each transducer is connected to a data select gate which controls the passage of data therethrough. Means are provided for producing a common IN USE signal having a prescribed state representative of the use of the record media for data transfer, and a plurality of DRIVE SELECT signals each having a prescribed state for causing one data select gate to allow the passage of data. For controlling the disk drive means in response to the IN USE and DRIVE SELECT signals, there are provided motor control circuits each adapted to set one disk drive motor into rotation when the assodicated DRIVE SELECT signal assumes the prescribed state for the first time after the IN USE signal has assumed the prescribed state, and to set the disk drive motor out of rotation when the assodiated DRIVE SELECT signal assumes the prescribed state for the first time after the IN USE signal has been set out of the prescribed state.

The above outlined invention is herein disclosed as adapted for a data transfer system having a plurality of flexible magnetic disk storage files daisy chained to a CPU via a controller. The controller delivers the IN USE and DRIVE SELECT signals to the motor control circuits built into the respective storage files. Each motor control circuit responds to the input signals as in the foregoing summary to control the rotation of the associated disk drive motor.

Our invention realizes a remarkable decrease in power consumption by the data transfer system of this type without substantially sacrificing accessibility to each disk file. First, even after the IN USE signal has assumed the prescribed state, all the disk drive motors remain out of rotation until the associated DRIVE SELECT signals are set into the prescribed state for the first time thereafter. Thus the total operating period of the disk drive motors is greatly reduced. Additionally, in the use of such daisy chained disk files, not all of them are necessary employed for data transfer during each run of operation. Our invention totally holds out of rotation the disk drive motors of those disk files to which no DRIVE SELECT signal is applied during the production of the IN USE signal. This of course results in very substantial curtailment of the power consumed by the complete system.

It should also be appreciated that, once set into rotation, the disk drive motors remain in rotation in spite of possible changes in the states of the associated DRIVE SELECT signals, until these signals assume the prescribed state for the first time after the IN USE signal has been set out of the prescribed state. This means that the disk files are readily accessible time and again after the start up of the disk drive motors.

Under certain circumstances it may be desirable to initiate the operation of the disk files all at one time. We have therefore also provided for the application of a common MOTOR ON signal from the controller to all the disk files.

The above and other features and advantages of our invention and the manner of realizing them will become more clearly apparent, and the invention itself will best be understood, from a study of the following description taken together with the attached drawings showing some preferable embodiments of the invention.

BRIEF DESCRIPTION OF THE DRAWINGS

FIG. 3 is a sectional illustration of the typical mechanical construction of each of the several daisy chained magnetic disk storage files in the data transfer system of FIG. 2;

FIG. 6 is a diagram of waveforms appearing in various parts of the FIG. 2 system, which are useful in explaining the operation of the system.

DETAILED DESCRIPTION

Figure 1:
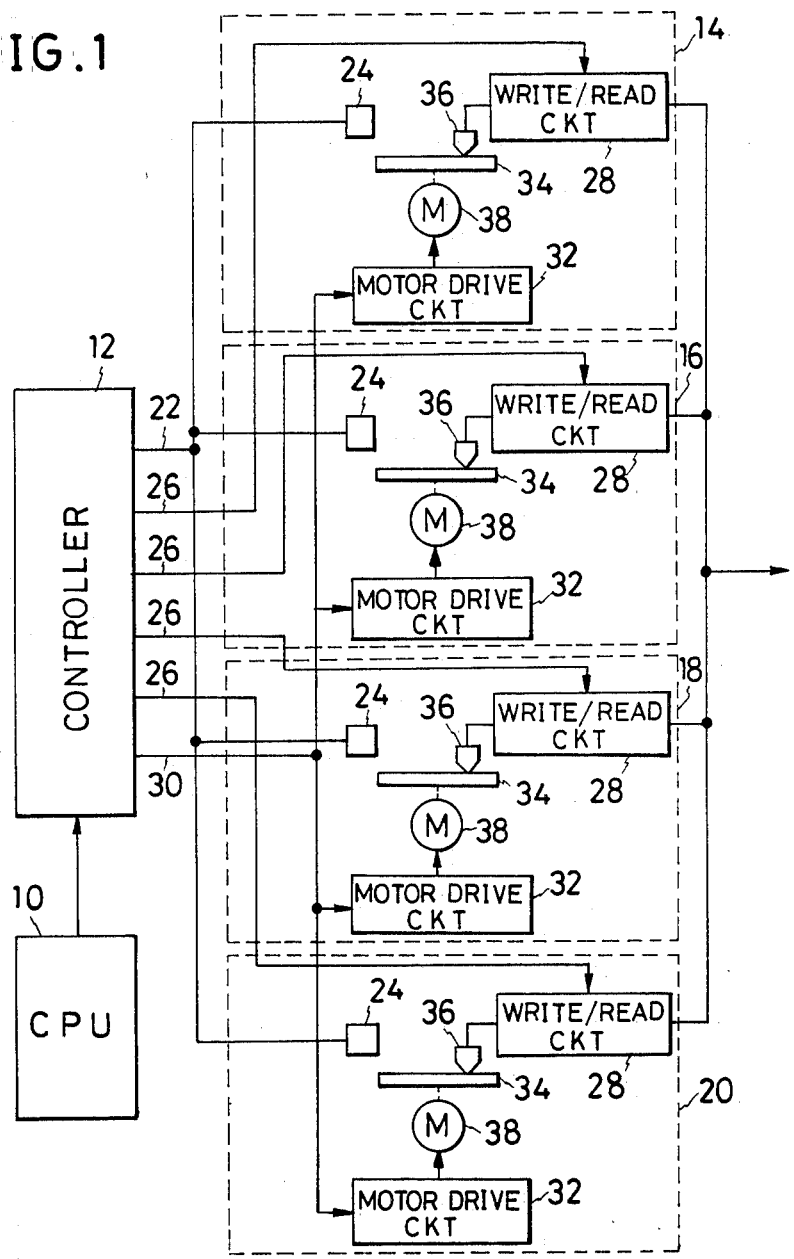
FIG. 1 is a schematic electrical diagram of a typical prior art data transfer system comprising a plurality of daisy chained magnetic disk storage files.

We will first describe the prior art data transfer system of the type in question in some more detail, the better to clarify the features and advantages of our invention. With reference to FIG. 1 the known data transfer system illustrated therein has a CPU 10 controlling, via a controller 12, a plurality of (e.g. four) daisy chained magnetic disk storage files 14, 16, 18 and 20. The controller 12 has the following circuits for controlling the disk files 14, 16, 18 and 20:

1. An IN USE circuit 22 for delivering a common IN USE signal to IN USE lamps 24 provided one in each disk file.

2. Four DRIVE SELECT circuits 26 for delivering DRIVE SELECT signals to respective write/read circuits 28 provided one in each disk file.

3. A MOTOR ON circuit 30 for delivering a common MOTOR ON signal to motor drive circuits 32 provided one in each disk file.

The IN USE signal from the controller 12 lights up the IN USE lamps 24 of the disk files 14 through 20 by way of indication of the fact that the disk files are in use for data transfer to or from magnetic disk cartridges 34 loaded therein. Alternatively the IN USE signal may be used for locking up the covers or lids of the disk files to prevent the loading or unloading of the disk cartridges. Either way the IN USE signal is intended to preclude the possibility of the disk files being inadvertently handled while the master constituted of the CPU 10 and controller 12 is controlling the slaves.

The DRIVE SELECT signals from the controller 12 set into operation the respective write/read systems for the disk cartridges 34 in the storage files 14 through 20. In the illustrated system the controller 12 produces no two DRIVE SELECT signals at one time in order to make possible the selective delivery of input data to each transducer head 36 and the selective extraction of output data from each disk cartridge 34. Connected to receive the DRIVE SELECT signals, the read/write circuits 28 include gates for such selective passage of input and output data therethrough. All the read/write circuits are interconnected as shown.

The MOTOR ON signal from the controller 12 activates the motor drive circuits 32 of all the disk files to concurrently set their disk drive motors 38 into rotation. Such concurrent rotation of all the drive drive motors 38 has been considered necessary for ready access to any desired disk cartridge, as from about 0.5 to 1.0 second is required for motor start up.

For selective data production by the prior art data transfer system of the foregoing configuration, the CPU 10 causes the controller 12 to deliver the IN USE signal to the IN USE lamps 24 of all the disk files 14 through 20. The consequently glowing lamps indicate that the disk files are in use or in condition for use. The controller 12 also delivers the MOTOR ON signal to the motor drive circuits 32 of all the disk files 14 through 20. Then a DRIVE SELECT signal may be applied from, for instance, the first DRIVE SELECT circuit 26 to the read/write circuit 28 of the first disk file 14 to cause the same to allow the passage of the output data from the first disk cartridge 34. The subsequent application of a DRIVE SELECT signal to the read/write circuit 28 of the second disk file 16, for instance, likewise results in data transfer from the second disk cartridge.

We concede some advantages of this prior art system. One is short access time; since the disk drive motors 38 of all the disk files are in constant rotation, the application of a DRIVE SELECT signal to any desired disk file results in immediate data production therefrom. Another is the simplicity of the complete system organization gained by the daisy chaining of the several disk files to the CPU.

We object, however, to that constant rotation of all the disk drive motors 38 because of the waste of energy. All the disk files are not necessary used for data transfer for just about the same length of time; rather, in some instances, only one of them may find use for a much longer time than the others. Further, in addition to the waste of energy, the disk cartridges and transducer heads undergo rapid wear. The selective driving of the disk drive motors by the DRIVE SELECT signals is objectionable for the reason set forth previously.

PREFERRED EMBODIMENT

Figure 2:
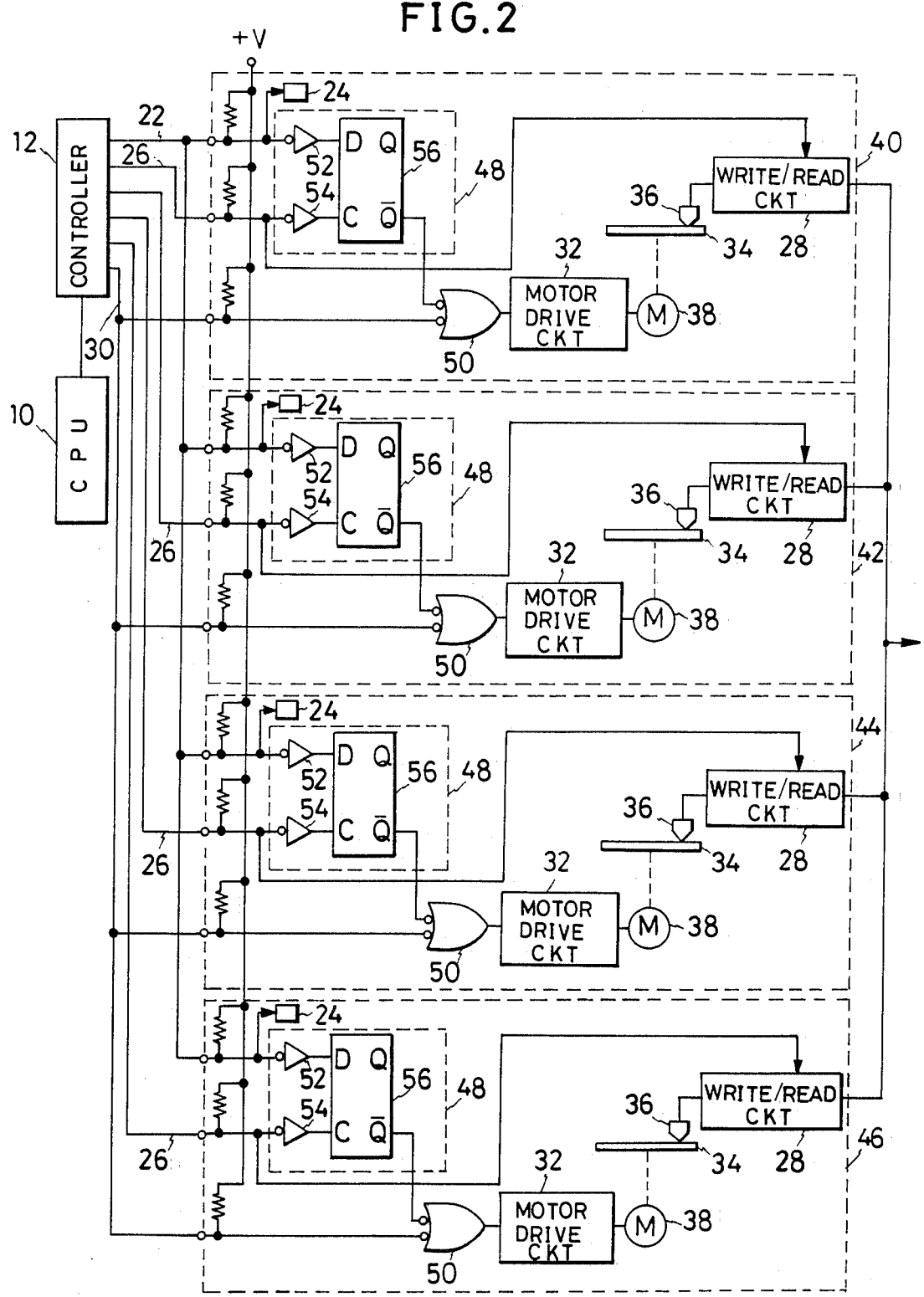
FIG. 2 is a schematic electrical diagram of the data transfer system as adapted for use with a plurality of flexible magnetic disks in accordance with the novel concepts of our invention.

FIG. 2 shows the improved data transfer system of our invention which overcomes the noted demerits of the prior art without substantially sacrificing its merits. In this and subsequent drawings we will use the same reference numerals in referring to some parts or components of the improved system as used to denote the corresponding parts or components of the prior art system.

The improved data transfer system is also shown to have four magnetic disk storage files 40, 42, 44 and 46 which are daisy chained to the CPU 10 via the controller 12. As in the prior art system each disk file of the the improved data transfer system comprises:

1. The IN USE lamp 24 to be lit up by the common IN USE signal from the IN USE circuit 22.

2. The read/write circuit 28 to be activated by the DRIVE SELECT signal from the associated one of the DRIVE SELECT circuits 26 for gating data transfer to and from the transducer head 36.

3. The motor drive circuit 32 responsive to the common MOTOR ON signal from the MOTOR ON circuit 30 for driving the disk drive motor 38 which rotates the magnetic disk cartridge 34 in data transfer contact with the transducer head 36.

Newly incorporated in each disk file in accordance with our invention are:

1. A motor control circuit 48 connected to receive the IN USE signal from the IN USE circuit 22 and the DRIVE SELECT signal from one of the DRIVE SELECT circuits 26.

2. An OR type NAND gate 50 connected upstream of the motor drive circuit 32 for inputting the MOTOR ON signal from the MOTOR ON circuit 30 and the output from the motor control circuit 48.

Each motor control circuit 48 comprises two NOT circuits 52 and 54 and a D flip flop (FF) 56. The FF 56 has a data input D coupled to the common IN USE circuit 22 via the NOT circuit 52. The clock input C of the FF 56 is coupled to the associated one of the DRIVE SELECT circuit 26 via the NOT circuit 54. Each NAND gate 50 has one input coupled to the $\overline{Q}$ output of the associated FF 56, and the other input to the common MOTOR ON circuit 30. The output of the NAND gate 50 is coupled to the associated motor drive circuit 32 for the controlled application of a MOTOR DRIVE signal thereto.

The output signals from the controller 12 are of low level. It is therefore necessary to connect its output signal circuits to a common biasing power supply designated +V.

We have illustrated in FIG. 3 an example of the mechanical construction of each storage file 40 through 46 as adapted for use with double sided flexible magnetic disks. The exemplified disk file includes a housing 58 having a front panel 60 in which there is formed a slot 62 for the insertion and withdrawal of the flexible magnetic disk cartridge 34 which is not shown in this figure. The IN USE lamp 24 is also disposed on this front panel 60.

Mounted approximately centrally within the file housing 58 is the disk drive motor 38 coupled directly to a drive hub 64 having a recess 66. A centering cone 68 overlies the drive hub 64 and is rotatably supported on the distal end of a support arm 70 pivotally cantileverd to the housing 58. The cone 68 is enageable in the recess 66 in the drive hub 64 for clamping the magnetic disk therebetween. The disk file further comprises a pair of transducer heads 36 and 36' arranged for data transfer contact with the opposite sides of the magnetic disk. Of course, if the disk file is intended for use with single sided magnetic disks, only one transducer head may be provided, as shown in FIG. 2. The lower transducer head 36' is mounted to a carriage 72 whereas the upper transducer head 36 is mounted to a carrier arm 74 pivotally cantilevered on the carriage 72. A suitable radial drive mechanism 76 such as that comprising a stepping motor is coupled to the carriage 72 for moving the same radially of the magnetic disk along guide rails 78.

Figure 4:
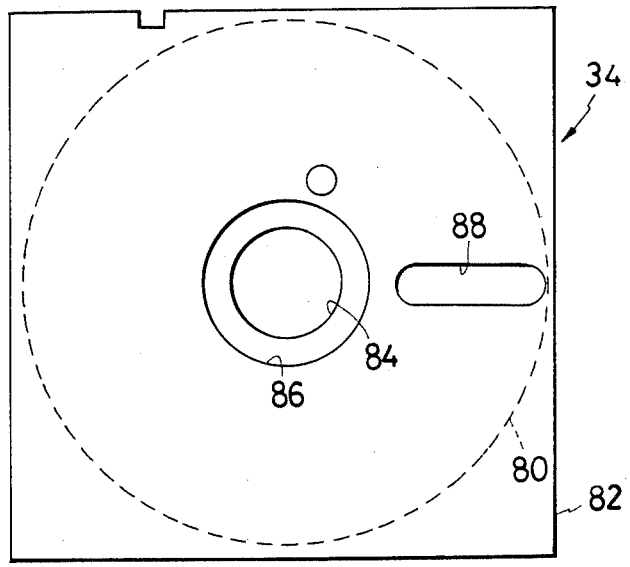
FIG. 4 is a plan of a flexible magnetic disk cartridge for use with the disk file of FIG. 3.

FIG. 4 shows the flexible magnetic disk cartridge 34 for use with the storage file of FIG. 3. The cartridge has a flexible magnetic disk 80 enclosed in a square envelope or jacket 82. The disk 80 has a central opening 84, and the envelope 82 has larger central openings 86 in its opposite sides. The thus exposed central part of the disk 80 is to be caught between drive hub 64 and centering cone 68 of the disk file, with the centering cone passing the central opening 84 in the disk. Further the jacket 82 has radial slots 88 in its opposite sides to expose parts of the opposite surfaces of the disk 80 for data transfer contact with the pair of transducer heads 36 and 36'.

Figure 5:
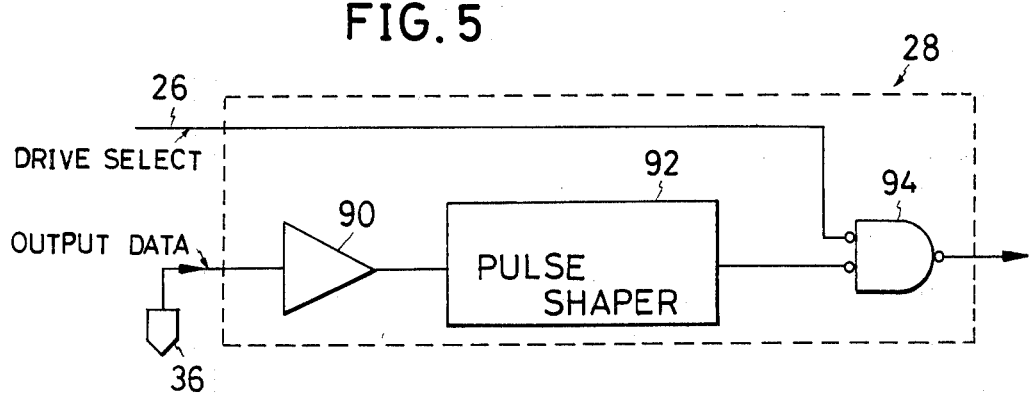
FIG. 5 is a schematic electrical diagram of means for data extraction in the write/read circuit of each disk file in the data transfer system of FIG. 2.

In FIG. 5 we have schematically illustrated only the means for data readout in each write/read circuit 28 of the FIG. 2 system for simplicity, and to make easier the subsequent description of operation. Included is an amplifier 90 coupled to the transducer head 36. Connected downstream of the amplifier 90 is a pulse shaper circuit 92 which functions primarily to shape the incoming pulses, representative of the output data extracted from the magnetic disk, into form suitable for further processing. The output of this amplifier is coupled to one input of a data select gate which takes the form of an AND type OR gate 94 in the illustrated embodiment. The other input of this data select OR gate is coupled to the associated one of the DRIVE SELECT circuits 26 for inputting the DRIVE SELECT signal. The data select OR gate 94 allows the passage of the output data therethrough only when the associated DRIVE SELECT signal is low.

OPERATION

The data transfer system of the foregoing configuration allows either simultaneous or selective driving of the four daisy chained disk files 40, 42, 44 and 46. In the following description of system operation in both cases we will refer mostly to the waveform diagram of FIG. 6. Depicted in this figure are, from top to bottom:

1. The common MOTOR ON signal applied from the controller MOTOR ON circuit 30 to one input of the NAND gate 50 of each disk file.

2. The common IN USE signal applied from the controller IN USE circuit 22 to the IN USE lamps 24 and motor control circuits 48 of all the disk files.

3. The first, second, third, and fourth DRIVE SELECT signals applied from the controller DRIVE SELECT circuits 26 to the motor control circuits 48 and write/read circuits 28 of the first 40, second 42, third 44, and fourth 46 disk files, respectively.

4. The first, second, third, and fourth MOTOR DRIVE signals applied from the NAND gates 50 to the motor drive circuits 32 of the first, second, third, and fourth disk files, respectively.

For simultaneously setting the disk drive motors 38 of all the disk files into rotation, as has been the case heretofore, the MOTOR on signal from the controller MOTOR ON circuit 30 is made low as at a moment M1 in FIG. 6. Consequently the outputs (MOTOR DRIVE signals) from the NAND gates 50 of all the disk files go high to cause the motor drive circuits 32 to set the disk drive motors 38 into rotation. The rotation of the disk drive motors 38, and therefore of the flexible magnetic disks, continues until the MOTOR ON signal goes high at a subsequent moment M2 with the result that the MOTOR DRIVE signals go low.

For the selective driving of the disk drive motors 38 in accordance with the novel concepts of our invention, on the other hand, the MOTOR ON signal is held high, as after the moment M2 in FIG. 6. Instead the IN USE signal from the controller IN USE circuit 22 is first made low as at a moment M3. Then, at a subsequent moment M4, any desired (e.g. first) DRIVE SELECT signal from one of the controller DRIVE SELECT circuits 26 is made low. The low DRIVE SELECT signal is effective to cause the $\bar{Q}$ output from the FF 56 of the first disk file 40 to go low as the inversion of the IN USE signal is latched. Consequently the MOTOR DRIVE signal from the first disk file NAND gate 50 goes high, causing the associated motor drive circuit 32 to set the first disk file motor 38 into rotation. The first DRIVE SELECT signal is shown to go high at a subsequent moment M5 and to repeat such changes in state during the ensuing low state of the IN USE signal. However, once the first disk file motor 38 starts rotation, the Q output from the FF 56 remains low despite such changes in the state of the first DRIVE SELECT signal as long as the IN USE signal remains low.

Thus, in FIG. 6, we have shown the first disk file motor 38 to be set out of rotation at a moment M8 immediately following a moment M7 when the IN USE signal is made to go high. It will have been seen, then, that the first disk file motor 38 commences rotation at the moment M4 when the first DRIVE SELECT signal goes low for the first time after the IN USE signal has gone low at the moment M3, and that the first disk file motor terminates rotation at the moment M8 when the first DRIVE SELECT signal goes low for the first time after the IN USE signal has gone high at the moment M7. The intermittent low states of the first DRIVE SELECT signal between the moments M3 and M7 are utilized for data transfer as the signal is impressed also to the first disk file write/read circuit 28, or to its OR gate 94, as has been set forth in connection with FIG. 5.

The second DRIVE SELECT signal is shown to go low at a moment M6 immediately following the moment M5. Thereupon the second disk file FF 56 latches the inverted IN USE signal, likewise resulting in the commencement of rotation of the second disk file motor 38 as the MOTOR DRIVE signal from the second disk file NAND gate 50 goes high. Thereafter, as long as the common IN USE signal remains low, the rotation of the second disk file motor 38 continues despite the changing states of the second DRIVE SELECT signal.

The third and fourth DRIVE SELECT signals are shown to remain high throughout the low state of the IN USE signal. Thus both third and fourth disk file motors remain out of operation after the moment M3.

As the first DRIVE SELECT signal goes low at the moment M8 for the first time after the IN USE signal has go high at the moment M7, the first disk file FF 56 becomes unlatched, with the result that the $\overline{Q}$ output therefrom goes high. Thus is the first disk file motor 38 set out of rotation. The second disk file motor 38 is likewise set out of rotation as the second DRIVE SELECT signal goes low at the moment M9 for the first time after the moment M7. It will of course be understood that the gates of the write/read circuits 28 of the disk files (first and second disk files in this case) open and close in synchronism with the changing states of the DRIVE SELECT signals for selective data transfer therethrough.

Although we have previously set forth some advantages gained by our invention, we may restudy them in more detail after having thus fully disclosed the construction and operation of the representative data transfer system in accordance with our invention.

1. All the disk file motors 38 remain out of rotation even after the IN USE signal has gone low, until the corresponding DRIVE SELECT signals go low for the first time thereafter. The total operating time of the motors is thus cut shorter than heretofore, affording a marked decrease in power consumption.

2. Once set into rotation, the disk file motors 38 remain in rotation until the associated DRIVE SELECT signals go low for the first time after the IN USE signal has gone high. Each disk file is therefore readily accessible in spite of changes in the state of the corresponding DRIVE SELECT signal following its initial low state after the IN USE signal has gone low.

3. In the waveform diagram of FIG. 6 the third and fourth DRIVE SELECT signals are shown to remain high throughout the low state of the IN USE signal. The associated third and fourth disk file motors remain out of rotation to avoid waste of energy.

4. Provision is made for the application of the common MOTOR ON signal to all the disk files, so that the disk drive motors may be driven either selectively or altogether.

5. The use of a D FF 56 in each motor control circuit 48 materially simplifies its construction.

ALTERNATIVE FORM

Figure 7:
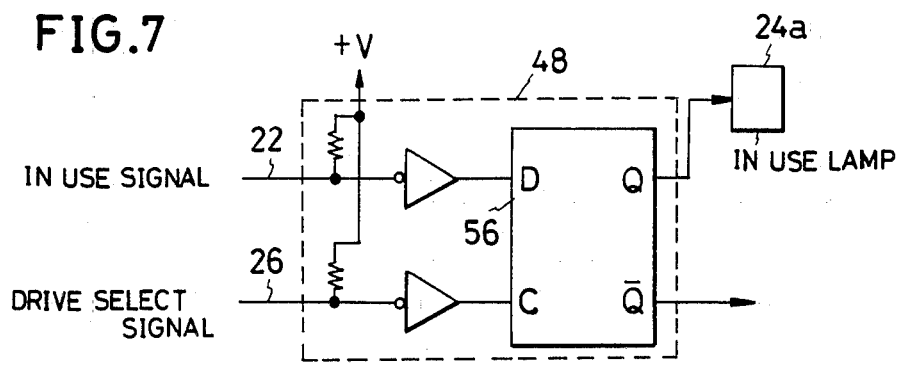
FIG. 7 is a schematic electrical diagram of a slight modification of the FIG. 2 system.

In a slight modification of the preceding embodiment shown in FIG. 7 each IN USE lamp 24a is connected to the Q output of the FF 56 of the associated motor control circuit 48, instead of being connected directly to the controller IN USE circuit 22 as in the foregoing embodiment. The IN USE lamp will then respond to both IN USE and DRIVE SELECT signals from the controller circuits 22 and 26, glowing only when the associated disk drive motor is in rotation. For example, in the case of the waveform diagram of FIG. 6, the IN USE lamp of the first disk file 40 will glow only during the period from moment M4 to moment M8, and the IN USE lamp of the second disk file 42 only during the period from moment M6 to moment M9.

POSSIBLE MODIFICATIONS

Although we have shown and described our invention in terms of specific embodiments, it is understood that these are by way of example only and not to impose limitations upon the invention. A variety of modifications or alterations will occur to one skilled in the art to conform to system requirements or design preferences, without departing from the scope of our invention. Given below are examples of such possible modifications:

1. A lid or equivalent means for closing the disk entrance opening of each disk file may be provided, together with a solenoid or like actuator for locking the closing means in the closed position, and the actuator may be actuated by the IN USE signal or by the Q output from the FF 56 of the associated motor control circuit 48.

2. An RS FF may be substituted for the D FF 56 in each motor control circuit 48. The RS FF of the first disk file, for example, may be set in response to the IN USE and first DRIVE SELECT signals as at the moment M4 in FIG. 6 and reset in response to the same signals as at the moment M8.

3. Optical, instead of magnetic, disks may be employed for data transfer through the agency of a laser beam or the like.

What we claim is:

1. A data transfer system for use with a plurality of disklike record media, comprising:
    (a) a plurality of disk drive means provided one for each record medium and each including a disk drive motor for rotating the associated record medium;
    (b) a plurality of transducers provided at least one for each record medium for data transfer therebetween during the rotation of the associated record medium;
    (c) a plurality of data select gates associated one with each transducer for controlling the passage of data therethrough;
    (d) means for producing a common IN USE signal having a prescribed state representative of the use of the record media, and a plurality of DRIVE SELECT signals for delivery one to each data select gate, each DRIVE SELECT signal having a prescribed state for causing the associated data select gate to allow the passage of data; and
    (e) a plurality of motor control circuits provided one for each disk drive means for controlling the same in response to the IN USE and DRIVE SELECT signals, each motor control circuit being effective to set the associated disk drive motor into rotation when the associated DRIVE SELECT signal assumes the prescribed state for the first time after the IN USE signal has assumed the prescribed state, and to set the associated disk drive motor out of rotation when the associated DRIVE SELECT signal assumes the prescribed state for the first time after the IN USE signal has been set out of the prescribed state.

2. The data transfer system of claim 1 wherein each motor control circuit comprises a D flip flop having a first input for receiving the common IN USE signal, a second input for receiving the associated DRIVE SELECT signal as a clock signal, and an output connected to the associated disk drive means.

3. The data transfer system of claim 1 further comprising means for delivering a common MOTOR ON signal to all the disk drive means for simultaneously setting all the disk drive motors into rotation.

4. The data transfer system of claim 1 further comprising a plurality of IN USE lamps associated one with each disk drive means and adapted to glow when the IN USE signal is in the prescribed state.

5. The data transfer system of claim 1 further comprising a plurality of IN USE lamps associated one with each disk drive means and connected one to each motor control circuit so as to glow when the associated disk drive motor is in rotation.

6. A data transfer system having a plurality of storage files, for use with flexible magnetic disks, which are daisy chained to a central processor unit via a controller, the controller producing a comon IN USE signal and separate DRIVE SELECT signals for application to the storage files, each storage file comprising:
 (a) disk drive means for rotating a flexible magnetic disk;
 (b) a transducer head for data transfer contact with the magnetic disk;
 (c) a data select gate connected to the transducer head and controlling the passage of data therethrough in response to the associated DRIVE SELECT signal from the controller; and
 (d) a control circuit for controlling the disk drive means in response to the IN USE signal and associated DRIVE SELECT signal from the controller, the control circuit causing the disk drive means to set the magnetic disk into rotation when the DRIVE SELECT signal assumes a prescribed state for the first time after the IN USE signal has assumed a prescribed state, and to set the magnetic disk out of rotation when the DRIVE SELECT signal assumes the prescribed state for the first time after the IN USE signal has been set out of the prescribed state;
 (e) the data select gate allowing the passage of data therethrough when the associated DRIVE SELECT signal is in the prescribed state.

7. The data transfer system of claim 6 wherein the controller further produces a common MOTOR ON signal for application to the storage files, the disk drive means of all the storage files being responsive to the MOTOR ON signal for simultaneously setting the magnetic disks into rotation.

8. The data transfer system of claim 6 wherein the motor control circuit of each storge file comprises a D flip flop having a first input connected to the controller for receiving the IN USE signal, a second input connected to the controller for receiving the associated DRIVE SELECT signal, and an output connected to the disk drive means.

9. The data transfer system of claim 8 wherein each storage file further comprises an IN USE lamp connected to another output of the D flip flop of the motor control circuit, the IN USE lamp glowing when the associated magnetic disk is in rotation.

* * * * *